(12) United States Patent
Davis, III et al.

(10) Patent No.: US 6,400,549 B1
(45) Date of Patent: Jun. 4, 2002

(54) DUAL CANTILEVERED ELECTROMAGNET-BASED GRIPPING APPARATUS

(75) Inventors: Laurance H. Davis, III, Malabar; Lane R. Smith, Melbourne; Dennis A. Green, Vero Beach; Ralph Trosa, Indialantic, all of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/566,457

(22) Filed: May 8, 2000

(51) Int. Cl.[7] .............................................. H01H 47/00
(52) U.S. Cl. ...................................... 361/144; 361/206
(58) Field of Search ................................. 361/160, 170, 361/206, 210, 144, 145, 152; 335/285, 286, 287, 289, 290

(56) References Cited

U.S. PATENT DOCUMENTS

| | | | |
|---|---|---|---|
| 3,720,796 A | 3/1973 | Honma | 179/100.41 |
| 4,004,108 A | 1/1977 | Kurata | 179/100.41 |
| 4,103,117 A | 7/1978 | Morinaga | 179/100.41 |
| 4,175,461 A | 11/1979 | Nagata et al. | 84/1.15 |
| 4,249,747 A | 2/1981 | Bauer | 369/136 |
| 4,352,176 A | 9/1982 | Itoh | 359/170 |
| 4,524,439 A | 6/1985 | Oguri | 369/136 |
| 4,554,610 A * | 11/1985 | Metz et al. | 361/144 |
| 4,811,153 A * | 3/1989 | Sakatos | 361/151 |
| 5,804,982 A | 9/1998 | Lo et al. | 324/758 |

\* cited by examiner

*Primary Examiner*—Ronald W. Leja
(74) *Attorney, Agent, or Firm*—Allen, Dyer, Doppelt, Milbrath & Gilchrist, P.A.

(57) ABSTRACT

A dual cantilevered electromagnet-based gripping mechanism has a reduced number of parts and operates with low power demand properties for use in micro-tool applications. Juxtaposed, cantilever-supported electromagnets, to which object engagement elements, such as gripping pincers, are attached, have their cores made of a low permeability material, such as stainless steel, that does not retain an induced magnetic field once the energizing current is terminated. By controlling the energizing current through the coils of the electromagnets, the magnitude of mutual magnetic attraction against the spring forces of their supporting cantilever arms is defined. This allows mutual separation between the electromagnets and object engagement force to be controlled, for seizure, retention, and release of an object. The displacement vs. current characteristic of the device has a hysteresis profile, which allows the coil energizing current to be reduced to a very low 'sustaining' value that minimizes power dissipation, yet keeps the gripping elements closed on the object. To release the object, the energizing current is controllably reduced, which collapses the magnetic fields in the electromagnets and allows the spring force of the cantilever arms to return the gripping elements to their default open positions.

20 Claims, 2 Drawing Sheets

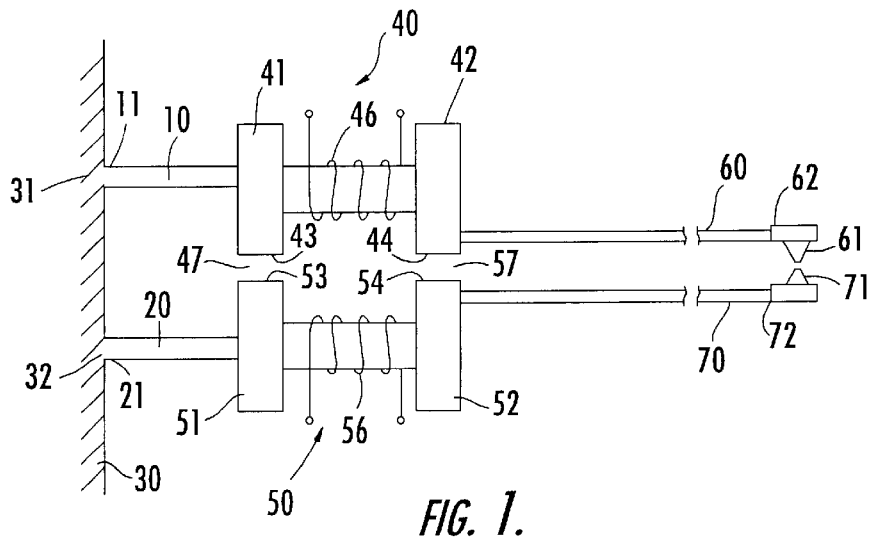
FIG. 1.
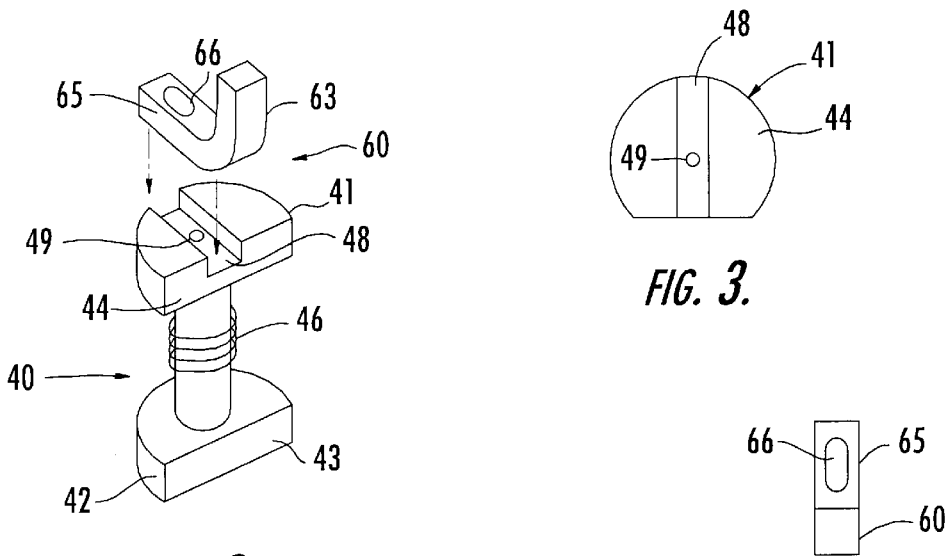
FIG. 2.
FIG. 3.
FIG. 4.
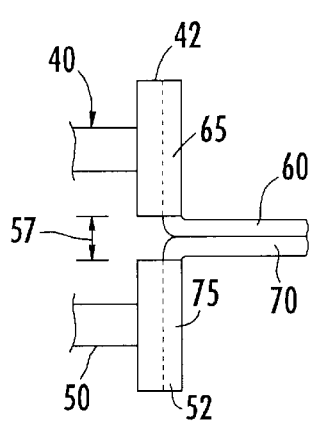
FIG. 5.

DUAL CANTILEVERED ELECTROMAGNET-BASED GRIPPING APPARATUS

FIELD OF THE INVENTION

The present invention relates in general to miniaturized object engagement devices, such as but not limited to actuators used for component seizure and manipulation in micro-tool systems and the like, and is particularly directed to a new and improved, diminished hardware-complexity and reduced power demand, current-controlled gripping mechanism. The gripping mechanism of the invention employs a pair of juxtaposed, mechanical spring-bias deflection element-supported (e.g., cantilever-mounted) electromagnets, to which respective object engagement elements (e.g., gripping pincers) are coupled. Current flow through the coils of the electromagnets provides mutual magnetic attraction that opposes the mechanical force of the spring-biased support members, so as to enable a pair of controllably manipulated gripping elements to seize an object. Reducing the controlled current flow through the electromagnets decreases the strength of their mutually coupled magnetic fields, so as to allow the spring force of the (cantilever) support members to controllably counter the gripping force imparted by the elements, and release the object.

BACKGROUND OF THE INVENTION

As the relatively infant micro-tool industry has begun to expand and develop devices and components for a variety of utility applications, it has examined whether existing packaging and deployment technology may be utilized in considerably reduced scale systems, such as object engagement and displacement mechanisms employed in miniaturized gripping devices of the type employed in medical instruments, semiconductor processing pick-and-place robotic components, and the like. Currently existing technology for controlling these types of devices customarily falls into actuator categories that make them unattractive and impractical solutions to the present needs of micro-tool systems.

For example, a DC motor-controlled gripper requires a second motor as an auxiliary (fail-safe mode) unit (to ensure that the gripper will return to its open position). Moreover, it cannot be actuated in the event of a power loss, and has a relatively large number of parts, size and weight. Solenoid actuators are essentially on/off devices, so that they have no position control capability, dissipate substantial heat, and are relatively large in size and weight. Thermal switch actuators and piezoelectric devices are also position control-limited (too small a range of motion) and dissipate a substantial amount of heat. In addition, each of these types of actuator subsystems requires a multi-component mechanical interface, such as a gear train and associated linkage system, between the drive unit and the miniaturized element(s) being deflected or displaced.

SUMMARY OF THE INVENTION

In accordance with the present invention, these drawbacks of conventional positioning actuators are effectively obviated by an electrically (current) controlled object engagement (e.g., gripping) device, that is configured of a substantially reduced number of parts and operates with low power demand, that makes it especially suitable for micro-tool applications. The miniaturized gripping mechanism of the invention employs a pair of electromagnets that are supported in mutually juxtaposed positions by associated spaced apart deflection elements. In a preferred embodiment, the deflection elements comprise cantilevered arms to which both the electromagnets and object-engaging (gripper) elements are affixed.

In a non-limiting but preferred embodiment, the cores of the two electromagnets are configured as truncated bobbin-shaped elements, that are made of a low permeability ferromagnetic material (such as 430 F and 430 FR stainless steel), and provides a relatively low reluctance path for a magnetic field produced by current flow through the coils of the electromagnets, but rapidly loses its ferromagnetic properties once the energizing current is terminated. By controlling the flow of energizing current through the coils of the electromagnets, the magnitude of mutual (magnetic) attraction against the spring forces of their (cantilever-supported) deflection arms may be controllably defined. This allows the mutual separation between the object engagement elements to be controlled, so as to enable seizure, retention, and release of an object.

The geometry of the cantilever configuration results has a hysteresis current flow vs. displacement characteristic, that may be exploited to allow the coil energizing current to be reduced from an initial level that is required to close the gripping elements upon and seize an object, to a relatively low 'sustaining' current value that holds the same displacement between the gripping elements. Since the gripping elements can be held closed on the object at this reduced current, $I^2R$-based heat loss in the coils is reduced. To release the object, it is only necessary to reduce (e.g., turn off) the energizing current, which reduces the magnetic fields in the two electromagnets and allows the spring force of the cantilever beams to return the gripping elements to their initial open positions.

BRIEF DESCRIPTION OF THE DRAWINGS

FIG. 1 diagrammatically illustrates the dual cantilevered electromagnet-based gripping mechanism of the present invention;

FIG. 2 is a diagrammatic perspective view of a respective electromagnet of the gripping mechanism of FIG. 1;

FIG. 3 is a diagrammatic end of a bobbin-shaped core of a respective electromagnet shown in FIG. 2;

FIG. 4 is a diagrammatic end of a support arm;

FIG. 5 is a diagrammatic side view of a portion of the gripping mechanism of FIG. 1, showing support arm spacing adjustability;

DETAILED DESCRIPTION

Figure 6:
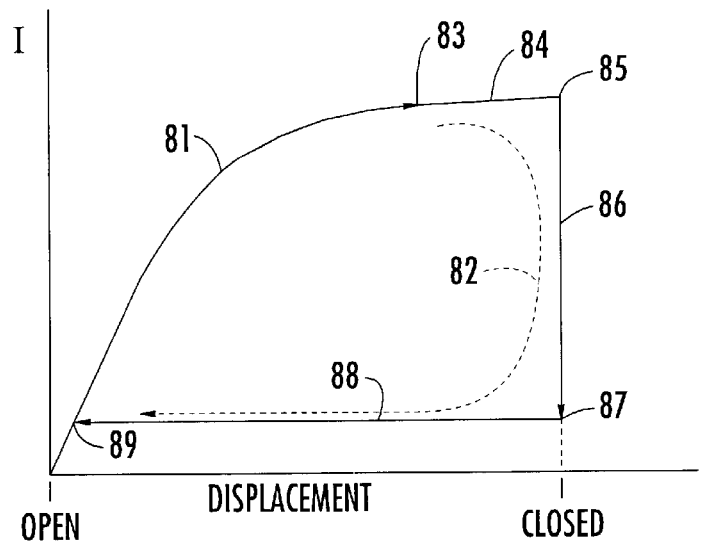
FIG. 6 shows the current flow vs. displacement characteristic of the magnetic circuit of the gripping mechanism of the present invention.

FIG. 1 diagrammatically illustrates the reduced hardware complexity, dual deflection element-supported, electromagnet-based gripping mechanism of the present invention as comprising a pair of spaced apart electromagnet and gripper element-supporting deflection elements 10 and 20. In accordance with a non-limiting, but preferred embodiment, the deflection elements are shown as being configured as a pair of generally spatially parallel, cantilevered elements, such as longitudinal arms, rods, spars or the like. For this purpose, respective first ends 11 and 21 of the deflection elements 10 and 20 are affixed in cantilever support fashion to spaced apart locations 31 and 32 of a base member 30, such as a robotic end effector arm of a microtool manipulation system, as a non-limiting example.

Mounted to the first cantilevered deflection element 10 is an associated first electromagnet 40. As diagrammatically shown in the perspective view of FIG. 2, the electromagnet 40 has a generally spool or bobbin-shaped core 41, with cylindrical end portions 42 and 43 thereof being truncated at generally planar surfaces or flats 44 and 45. These flats are juxtaposed to corresponding flats 54 and 55 of respective end portions 52 and 53 of a spool or bobbin-shaped core 51 of a second electromagnet 50, that is mounted to the cantilevered deflection element 20.

This truncated configuration is such that, in response to a control current applied to coils 46 and 56 wound on the cores 41 and 51, respectively, the electromagnets may be brought into direct abutment, or be positioned very close together. As pointed out above, in accordance with a non-limiting by preferred embodiment, the cores of the electromagnets are made of a low permeability ferromagnetic material (such as 430 F and 430 FR stainless steel), that provides a relatively low reluctance path for the magnetic fields therethrough.

Although one of the electromagnets may be replaced by a permanent magnet or other element of ferromagnetic material, such as a section of iron and the like, doing so would require an increased drive current to the controllably energized electromagnet for a given differential displacement between of the deflection arms 10 and 20. Also, the use of a high permeability magnetic material or permanent magnet is undesirable, since it causes a magnetic field to be retained, even in the deenergized state of the electromagnet, and thereby complicates the spreading of the deflection arms (as by requiring the application of a reverse current) to open the gripping elements from an object.

Instead, it is preferred that the electromagnet 50 be configured complementary to electromagnet 40, as described above, so that the opposing flats of their bobbin-shaped cores define a pair of transverse air gaps 47 and 57 therebetween in the de-energized state of each electromagnet. The lengths of the air gaps 47 and 57, and thereby the spacings between the cores 41 and 51, are established in accordance with predefined geometry and force relationships of respective object engagement (gripping) elements 61 and 71 mounted to distal ends 62 and 72 of respective support arms 60 and 70, respectively.

As shown in the perspective view in FIG. 2 and further in the associated end views of FIGS. 3 and 4, using the support arm 60 as a representative example, a base end 63 of the support arm 60 may terminate in an L-shaped end portion 65, that is sized to fit within an associated slot 48 in the end portion 42 of the core 41. This L-shaped end portion 65 of the support arm 60 may include an elongated slot 66, which receives a fastener, such as a screw or the like, that engages a corresponding tapped bore 49 in the slot 48 of the end portion 41 of the core, and thereby provides for fixed, but adjustable attachment of the support arm 60 to the core 41. The support arm 70 and the end portion 52 of the core 51 of the second electromagnet are similarly configured.

Because these mounting configurations for the two support arms 60 and 70 are adjustable, they enable the relative positions of the support arms, and thereby their associated gripping elements 61 and 71, to be precisely established in the at rest (non-energized) state of the gripping mechanism. As shown in the side view of FIG. 5, this spacing adjustability allows the L-shaped end portions 65/75 of the support arms 60/70 to be mounted to the end portions 42/52 of the electromagnets in such a manner that the minimum air gap 57 therebetween (the default, or at rest, spacing with no applied coil current) can be reduced to or near zero. This may be used when operating in the non-linear range of the magnetic circuit, as will be described.

The relative spatial positions between, and the gripping force imparted by, the gripping elements 61 and 62 are defined by the combined effect of the controlled attractive magnetic force between the electromagnets 40 and 50, due to the current flow through windings 46 and 56, and the countering or opposing spring force of the cantilevered deflection elements 10 and 20. The directions of current flow through the coils 46 and 56 are defined (in opposite directions), so as to induce a pair of magnetic fields having complementary (S/N, N/S) magnetic poles at the mutually opposing flats 42/52 and 43/53 of the truncated cores 41 and 51, and thereby cause mutual magnetic attraction between the electromagnets 40 and 50.

This current-controlled magnetic attraction is countered by the inherent spring force of the cantilevered deflection elements 10 and 20 to which the electromagnets are mounted. As a consequence, in the absence of current flow in the coils 46 and 56, the electromagnets will be mutually spaced apart in a prescribed 'at rest' condition, by the pair of default position air gaps 47 and 57. This serves to ensure that simply terminating the applied current (i.e., no current flow reversal is necessary) will allow the spring bias of the cantilevered deflection elements 10 and 20 to return the electromagnets 40 and 50 and associated gripping elements 61 and 71 at the ends of the support arms 60 and 70 to their respective default open positions.

It may be noted that reversing the direction of current flow relative to that of normal operation, described above, will cause magnetic force repulsion between the two electromagnets. This property may be exploited to controllably increase the separation between the electromagnets and the gripping elements relative to their default positions. Such reverse current-controlled increased separation allows the invention to be used to engage and grip objects of a size larger than the default settings.

As noted above, the spacings 47 and 57 between the electromagnets 40 and 50 are established in accordance with predefined geometry and force relationships of the object engagement (gripping) elements 61 and 71 at the distal ends 62 and 72 of their respective support arms 60 and 70. The geometry and air gaps are variables which also 'tuning' of the gripping mechanism for variations in gripping force and opening size.

FIG. 6 shows the current flow vs. displacement characteristic of the magnetic circuit of the gripping mechanism of the present invention. As shown therein, the characteristic has a hysteresis property (that results from the geometry of the cantilever configuration). This hysteresis effect may be exploited for reduced current operation, as will be described below. For generally linear operation, the magnitude of applied coil current may be defined to fall within a generally monotonic and mostly linear portion 81 of the characteristic, so that the gaps 47 and 57 between the electromagnets, and thereby the separation between the gripping elements 61/71 at the distal ends of the support arms 60/70 is generally proportional to applied coil current I.

In an alternative 'non-linear' mode of operation, the electromagnets may be operated so as to apply a relatively large amount of force to initially 'squeeze' an object. This is shown by a non-linear portion, that begins at a bifurcation point 83, where the applied current reaches what is effectively a saturation region 84, and causes the mutual separation between the electromagnets to rapidly reach its maximum value at a point 85. While a further increase in coil current will not cause any additional reduction in separation, it will increase the magnetic attraction between the electromagnets and thereby the holding force imparted by the grippers against the object.

The energizing current may then be reduced to a relatively low 'sustaining' value that keeps the gripping elements closed on the object. This is shown by the coil current being reduced substantially along a vertically sloped portion 86 down to a value of 'sustaining' current at point 87, that maintains the same displacement between the gripping elements. Since the gripping elements are maintained closed on the object at this reduced current, $I^2R$-based heat loss in the coils are reduced. With the current now at a minimum (sustaining) value, then by only a slight further reduction in energizing current, as shown by region 88, the magnetic fields in the two electromagnets are caused to rapidly collapse. This allows the spring force of the cantilever beams 10 and 20 to return the electromagnets 40 and 50 and their associated gripping elements 61 and 62 very near to their initial open positions 89. Reducing the current all the way down to zero (turning it off) brings the displacement to the fully opened position.

Figure 7:
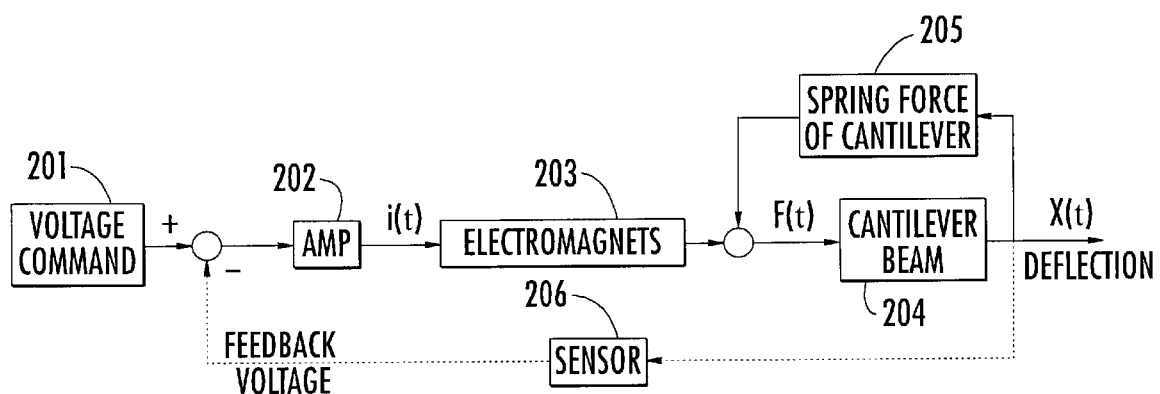
FIG. 7 is a servo diagram associated with the operation of the dual cantilevered electromagnet-based gripping mechanism of the invention.

The operation of the gripping mechanism of the invention for both open loop and closed loop control is illustrated in the flow diagram of FIG. 7. In response to a voltage command input 201, a deflection current is produced by a current amplifier 202 and applied to the windings of the electromagnets 40 and 50. The amount of magnetic force $F_m$ produced in the magnetic circuit 203 through the two cores 41 and 51 and their associated air gaps 47, 57 of the pair of electromagnets 40 and 50 is deterministically definable in association with this applied current. This magnetic force $F_m$ operates so as to cause a spatially deflection or bending 204 of the two cantilevered deflection elements 10 and 20 toward one another. As shown at 205, in opposition to this current controlled deflection is the countering spring constant-based force $F_c$ within the cantilevered elements, which is deterministically definable in association with the amount of spatial deflection from their default (at rest) positions. As a result, for a given magnitude applied current, the amount of deflection of each cantilever element and thereby seizure and retention force imparted by the gripping elements 61 and 62 may be readily defined.

Where the non-linear inherent hysteresis characteristic of FIG. 6 is used to reduce energy consumption (and associated heat dissipation), an optional feedback loop sensor 206 is employed to provide adaptive tuning or adjustment of the control voltage applied to the current amplifier 202 for setting the control current for a prescribed arm deflection and gripping force. As described above, once the two electromagnets have been deflected to cause complete closure of the air gap therebetween, the coil energizing current is reduced to a sustaining value, that keeps the gripping elements closed on the object. This reduces power consumption and unwanted $I^2R$ heat dissipation in the coil windings, and avoids the need for a forced convection cooling subsystem (e.g. fan).

For either open loop or closed loop operation, in order to release the gripping force between the two gripping elements 61 and 62, it is only necessary to reduce the energizing current to a predetermined level. As described, this decreases or collapses the magnetic fields in the two electromagnets 40 and 50, and allows the spring force of the deflection elements 10 and 20 to increase the mutual spacing between the electromagnets and thereby open the gripping elements. The spring-based opening force ensures that the gripping elements will be returned to their default open position whenever coil current is terminated. This serves as a safety mechanism, as it opens the grippers in the event of a loss of power.

As will be appreciated from the foregoing description, the drawbacks of conventional positioning actuators are effectively obviated by the cantilever-mounted electromagnet-driven object engagement device of the present invention. Not only is the invention configured of a relatively small number of parts, which serves to facilitate its manufacture and reduce its need for refurbishment and repair, but it operates with substantially reduced heat dissipation properties, compared to solenoids, thermal actuators, etc., making it especially suitable for micro-tool applications. As a safety feature, the invention is configured so that any object engagement force is dependent upon actively applied current, thereby ensuring that the cantilevered support arms will return the gripping elements to their default open position once current is terminated.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A controllable deflection device comprising:
   a first electromagnet supported by a first deflection element;
   a second electromagnet supported by a second deflection element spaced apart from said first deflection element;
   a first manipulatable element coupled with said first deflection element; and a second manipulatable element coupled with said second deflection element; and wherein said first electromagnet is juxtaposed to said second electromagnet so as to provide mutual magnetic attraction between said first and second electromagnets in response to controlled current flow therethrough, and thereby a controlled reduction in physical separation between said first and second electromagnets, and between said first and second manipulatable elements against a spring force of said first and second deflection elements, allowing said spring force of said first and second deflection elements to diminish said reduction in physical separation between said first and second electromagnets and said first and second manipulatable elements, for a prescribed reduction in said current flow.

2. A controllable deflection device according to claim 1, wherein said first and second manipulatable elements comprise respective object gripping elements mounted in fixed relationship with said first and second electromagnets, such that a change in said physical separation between said first and second electromagnets causes an associated change in physical separation between said object gripping elements.

3. A controllable deflection device according to claim 1, wherein said first and second deflection elements comprise generally spatially parallel, longitudinal elements, having first ends thereof affixed in cantilever support fashion to spaced apart locations of a base member, and wherein each of said first and second electromagnets comprises a coil wound upon a magnetic flux-concentrating core mounted integral with a respective cantilevered deflection element, and wherein cores of said first and second electromagnets have face portions thereof mutually juxtaposed to one another, so as to define a pair of transverse air gaps therebetween in the de-energized state of each electromagnet.

4. A controllable deflection device according to claim 3, wherein directions of current flow through said coils are such as to induce a pair of magnetic fields having complementary magnetic poles at face portions of cores and thereby cause mutual magnetic attraction between said first and second electromagnets.

5. controllable deflection device according to claim 3, wherein said electromagnets include truncated generally bobbin-shaped cores juxtaposed to one another.

6. A controllable deflection device according to claim 3, wherein said first and second manipulatable elements comprise respective object gripping elements mounted in fixed relationship with said first and second electromagnets, such that a change in said physical separation between said electromagnets causes an associated change in physical separation between said object gripping elements, and wherein, in response to deflection of said electromagnets to reduce said transverse air gaps therebetween, said current is controllably reduced to a prescribed sustaining current value that conforms with a hysteresis characteristic of said electromagnets and maintains said gripping elements closed upon an object.

7. A controllable deflection device according to claim 1, wherein current applied to said electromagnets is adaptively controlled by a feedback loop to provide a prescribed mutual separation of said manipulatable elements.

8. A controllable deflection device according to claim 2, wherein separation between said first and second electromagnets is adjustably presetable for non-energized states thereof, so as to establish a minimum gap therebetween.

9. A method of controllably deflecting first and second object engagement elements relative to one another, so as to enable an object to be seized and manipulated thereby comprising the steps of:

(a) coupling said first and second object engagement elements to associated first and second electromagnets that are supported by first and second deflection elements in spaced apart cantilever fashion, and being mutually juxtaposed so as to provide, in response to current flow therethrough, mutual magnetic attraction and an associated reduction in physical separation therebetween, and thereby between said first and second object engagement elements against a spring force of said first and second deflection elements; and (b) applying a controlled current to said electromagnets so as to cause said mutual magnetic attraction against said spring force and an associated reduction in physical separation therebetween, and thereby between said first and second object engagement elements, so as to bring said first and second object engagement elements into engagement with and seize said object.

10. A method according to claim 9, further including the step of:

(c) reducing said current to a value less than that for which said first and second object engagement elements engage and seize said object in step (b), but which is sufficient to maintain mutual magnetic attraction and associated reduction in physical separation between said electromagnets, so as to maintain said first and second object engagement elements in engagement with said object.

11. A method according to claim 9, further including the step of:

(c) reducing said current to a value that allows said spring force of said first and second cantilevered deflection elements to separate said first and second object engagement elements from said object.

12. A method according to claim 9, wherein said first and second cantilevered deflection elements comprise generally spatially parallel, longitudinal elements, having first ends thereof affixed in cantilever support fashion to spaced apart locations of a base member, and wherein each of said first and second electromagnets comprises a coil wound upon a magnetic flux-concentrating core integral with a respective cantilevered deflection element, and wherein said first and second electromagnets have face portions thereof mutually juxtaposed to one another, so as to define a pair of transverse air gaps therebetween in the de-energized state of each electromagnet.

13. A method according to claim 12, wherein directions of current flow through said coils are such as to induce a pair of magnetic fields having complementary magnetic poles at said face portions of said cores and thereby cause mutual magnetic attraction between said first and second electromagnets.

14. A method according to claim 12, wherein said electromagnets include truncated generally bobbin-shaped cores juxtaposed to one another.

15. A method according to claim 9, wherein step (b) includes controlling current applied to said electromagnets by a feedback loop that monitors at least one of force applied to said object by and mutual separation of said object engagement elements.

16. A method according to claim 9, wherein separation between said first and second electromagnets is adjustably presetable for non-energized states thereof, so as to establish a minimum gap therebetween.

17. An electrically controlled object gripping mechanism comprising a pair of electromagnets supported in mutually juxtaposed positions by respective spaced apart deflection elements, to which object-engaging gripper elements are affixed, each electromagnet having a core of low permeability ferromagnetic material that provides a relatively low reluctance path for a magnetic field produced by current flow through a coil of said electromagnet, but rapidly loses its ferromagnetic properties once said current is terminated, the juxtaposed positions of said electromagnets being such as to provide, in response to current flow therethrough, mutual magnetic attraction therebetween and thereby a reduction in physical separation between said object-engaging gripper elements against spring forces of said deflection elements, and allowing said spring forces of said deflection elements to terminate said reduction in physical separation between said electromagnets and said object-engaging gripper elements for a prescribed reduction in said current flow.

18. An electrically controlled object gripping mechanism according to claim 17, wherein said deflection elements comprise generally spatially parallel, longitudinal elements, having first ends thereof affixed in cantilever support fashion to spaced apart locations of a base member, and wherein each of said electromagnets comprises a coil wound upon a truncated, generally bobbin-shaped magnetic flux-concentrating core mounted integral with a respective cantilevered deflection element, and wherein said truncated, generally bobbin-shaped cores of said first and second electromagnets have face portions thereof mutually juxtaposed to one another, so as to define a pair of transverse air gaps therebetween in the de-energized state of each electromagnet.

19. An electrically controlled object gripping mechanism according to claim 17, wherein directions of current flow through coils of said electromagnets are such as to induce a pair of magnetic fields having complementary magnetic poles at juxtaposed face portions of said cores and thereby cause mutual magnetic attraction between said first and second electromagnets, but otherwise in the absence of current flow provide no magnetic field sufficient to overcome spring constant-based deflection force of said deflection elements.

20. An electrically controlled object gripping mechanism according to claim 17, wherein separation between said electromagnets is adjustably presetable for non-energized states thereof, so as to establish a minimum gap therebetween.

* * * * *